United States Patent [19]

Tasaka et al.

[11] Patent Number: 4,601,328

[45] Date of Patent: Jul. 22, 1986

[54] METHOD AND APPARATUS FOR THE TEMPERATURE BALANCING CONTROL OF A PLURALITY OF HEAT EXCHANGERS

[75] Inventors: Yasuo Tasaka; Sadao Masuda; Kiyoshi Sasaki, all of Kudamatsu, Japan

[73] Assignee: Hitachi, Ltd., Tokyo, Japan

[21] Appl. No.: 650,526

[22] Filed: Sep. 14, 1984

[30] Foreign Application Priority Data

Sep. 21, 1983 [JP] Japan ................. 58-172919

[51] Int. Cl.$^4$ ............. G05D 23/00; F28F 27/02
[52] U.S. Cl. ..................... 165/12; 165/34; 165/40; 165/101
[58] Field of Search .......... 165/12, 34, 101, 39, 165/40

[56] References Cited

U.S. PATENT DOCUMENTS

| 1,906,422 | 5/1933 | Roulton | 165/34 |
| 3,167,113 | 1/1965 | Kleiss | 165/34 X |
| 3,176,759 | 4/1965 | Windam | 165/40 X |
| 3,202,208 | 8/1965 | Geiringer | 165/40 X |
| 4,182,403 | 1/1980 | Margen | 165/12 |
| 4,307,576 | 12/1981 | Takano et al. | 165/12 X |

FOREIGN PATENT DOCUMENTS

| 51-30304 | 8/1976 | Japan | 165/34 |
| 58-9920 | 2/1983 | Japan | 165/34 |
| 0142199 | 8/1983 | Japan | 165/40 |
| 0210498 | 12/1983 | Japan | 165/34 |
| 0032732 | 2/1984 | Japan | 165/40 |
| 1011999 | 4/1983 | U.S.S.R. | 165/12 |

Primary Examiner—Albert W. Davis, Jr.
Assistant Examiner—Randolph A. Smith
Attorney, Agent, or Firm—Antonelli, Terry & Wands

[57] ABSTRACT

A method for the temperature balancing control of a plurality of heat exchangers wherein, in case of operating the heat exchangers connected in parallel, the temperatures of a medium to-be-heated on the outlet sides of the respective heat exchangers are balanced. According to the method, the temperatures of the same positions of the heat exchangers except for the inlets thereof for the medium to-be-heated are sensed, the respective sensed values are compared with a temperature setting value so as to calculate control signals, all the control signals are subsequently revised so that the maximum value among the control signals may agree with a preset control reference value, and temperature regulation means disposed for the respective heat exchangers are controlled on the basis of the revised control signals.

6 Claims, 3 Drawing Figures

METHOD AND APPARATUS FOR THE TEMPERATURE BALANCING CONTROL OF A PLURALITY OF HEAT EXCHANGERS

BACKGROUND OF THE INVENTION

1. Field of the Invention

The present invention relates to a method and apparatus for the temperature balancing control of a plurality of heat exchangers.

2. Description of the Prior Art

As various plants become larger in size, various heat exchangers for use in them ought to be enlarged correspondingly. It is the actual situation, however, that the enlargement of the heat exchangers is limited in relation to manufacturing equipment and fabricating techniques.

For this reason, in a large-sized plant, the case of using a plurality of heat exchangers connected in parallel by piping is increasing. On that occasion, the control of the distribution of fluid flow rates to the respective heat exchangers becomes a problem.

More specifically, even when the respective heat exchangers are fabricated in accordance with the same specifications, the dispersion of fluid resistances is inevitable, and dispersions arise also in the fluid resistances of pipes connecting the heat exchangers, the fluid resistances of valves disposed midway of pipes, etc. Therefore, the flow rate distribution to the individual heat exchangers becomes unbalanced, with the result that unbalanced temperatures develop in various parts of the heat exchangers.

It is necessary to correct the unbalance and to operate all the parallel heat exchangers while their temperatures are being balanced.

The temperature balancing control is performed by equipping the respective heat exchangers with control valves for regulating the fluid flow rates and regulating the control valves individually. When only the temperature balance is considered, the temperatures may be balanced with all the control valves kept close to their fully closed states. In order to realize the stable operation and efficient operation of the plant, however, the temperatures should preferably be balanced with the control valves kept close to their fully open states.

A known prior-art method for the temperature control of a plurality of heat exchangers is disclosed in the official gazette of Japanese Patent Application Publication No. 51-30304.

In the aforementioned known temperature control method for a multiple heat exchanger in which a plurality of heat exchangers are arranged in parallel, temperatures are sensed at the same positions of the respective heat exchangers except for the inlets thereof for a fluid subject to heat exchange, the mean temperature of the sensed temperatures is evaluated, and the sensed temperatures are compared with the mean temperature so as to regulate the flow rates of a heat exchanging fluid, whereby the temperatures of the fluid subject to the heat exchange are averaged.

With this known method, the flow rates of the heat exchanging fluid in the respective heat exchangers are controlled using the mean temperature as a reference value. It is theoretically possible, however, that the balanced relationship of the temperatures holds in the state in which the openings of all control valves for controlling the flow rates are close to the full opening or the full closure. Therefore, the method left intact is problematic in practical use.

In addition, a prior-art control method according to which the temperatures do not become balanced in the full closure direction is disclosed in the official gazette of Japanese Patent Application Publication No. 58-9920.

In a multiple heat exchanger wherein a plurality of heat exchangers are used in parallel, this method consists in sensing the temperatures of the same positions of the respective heat exchangers except for the inlets thereof for a fluid subject to heat exchange and the inlets thereof for a heating fluid, selecting the temperature of any desired one of the positions as a control reference value, and adjusting the fluid flow rates of the respective heat exchangers so that the sensed temperatures may agree with the control reference value.

In such method, using the desired position for the control reference value, the fluid flow rates of the respective heat exchangers are adjusted so that the sensed temperatures may agree. However, when control valves have become fully open, they cannot be opened more, and the method becomes uncontrollable.

SUMMARY OF THE INVENTION

An object of the present invention is to provide a method and apparatus for the temperature balancing control of a plurality of heat exchangers, which are free from the drawbacks mentioned above and which are high in reliability.

In one aspect of performance of the present invention, a method for the temperature balancing control of a plurality of heat exchangers wherein temperatures of the same positions of the plurality of heat exchangers used in parallel, the positions being except for inlets of the heat exchangers for a medium to-be-heated, are respectively sensed, the sensed temperature values are respectively compared with a temperature setting value so as to calculate control signals for balancing temperatures of the medium to-be-heated which flows out of the respective heat exchangers, and regulation means for the respective heat exchangers are controlled on the basis of the control signals; is characterized by revising all the control signals so that a maximum value among said control signals may agree with a preset control reference value, and controlling said regulation means on the basis of the revised control signals.

In another aspect of performance of the present invention, an apparatus for the temperature balancing control of a plurality of heat exchangers connected in parallel, comprising thermometers or temperature sensors which sense temperatures of the same positions of the heat exchangers respectively, the positions being except for inlets of the heat exchangers for a medium to-be-heated, regulation means to control temperatures of the medium to-be-heated in the heat exchangers respectively, and arithmetic control means to receive the sensed temperature values of the temperature sensors, to compare the respective sensed temperature values with a temperature setting value so as to calculate control signals for balancing temperatures of the medium to-be-heated which flows out of the respective heat exchangers, and to supply the control signals to the regulation means; is characterized in that said arithmetic control means has a function of revising all the control signals so that a maximum value among said control signals may agree with a preset control reference value, the revised control signals being supplied to said regulation means.

Other objects and features of the present invention will become apparent from the following description taken with reference to the drawings.

DESCRIPTION OF THE PREFERRED EMBODIMENT

Now, the present invention will be described in detail with reference to the drawings.

Figure 1:
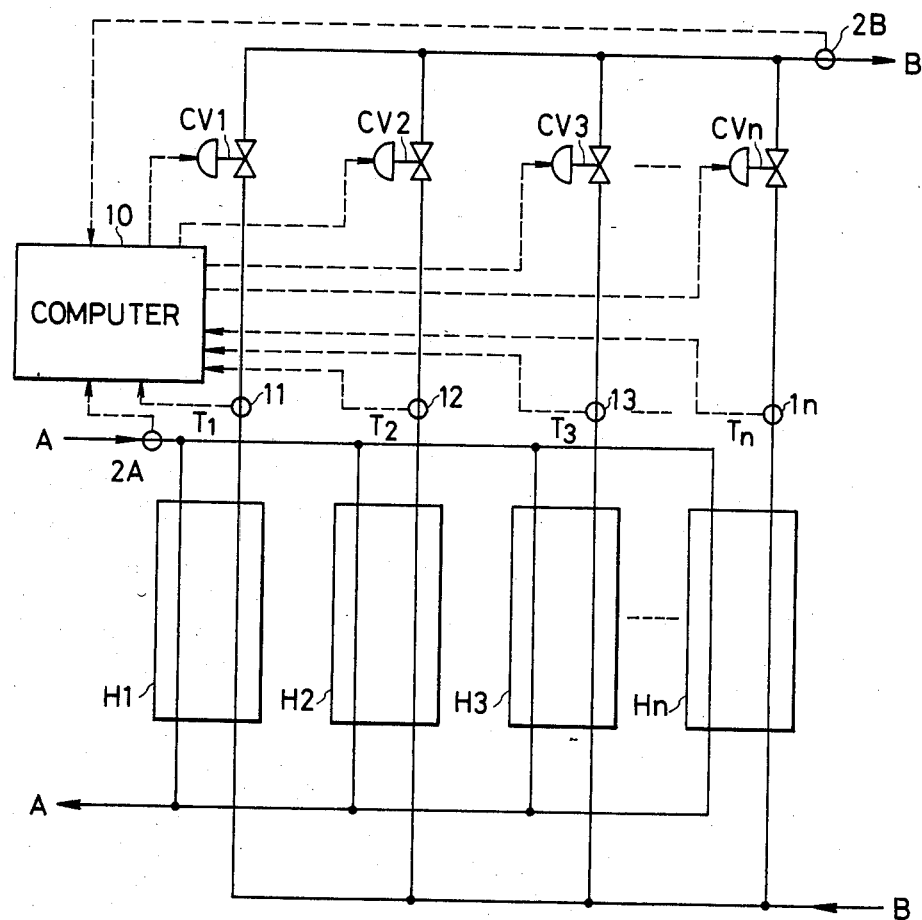
FIG. 1 is a general block diagram showing an embodiment of the present invention.
Figure 2:
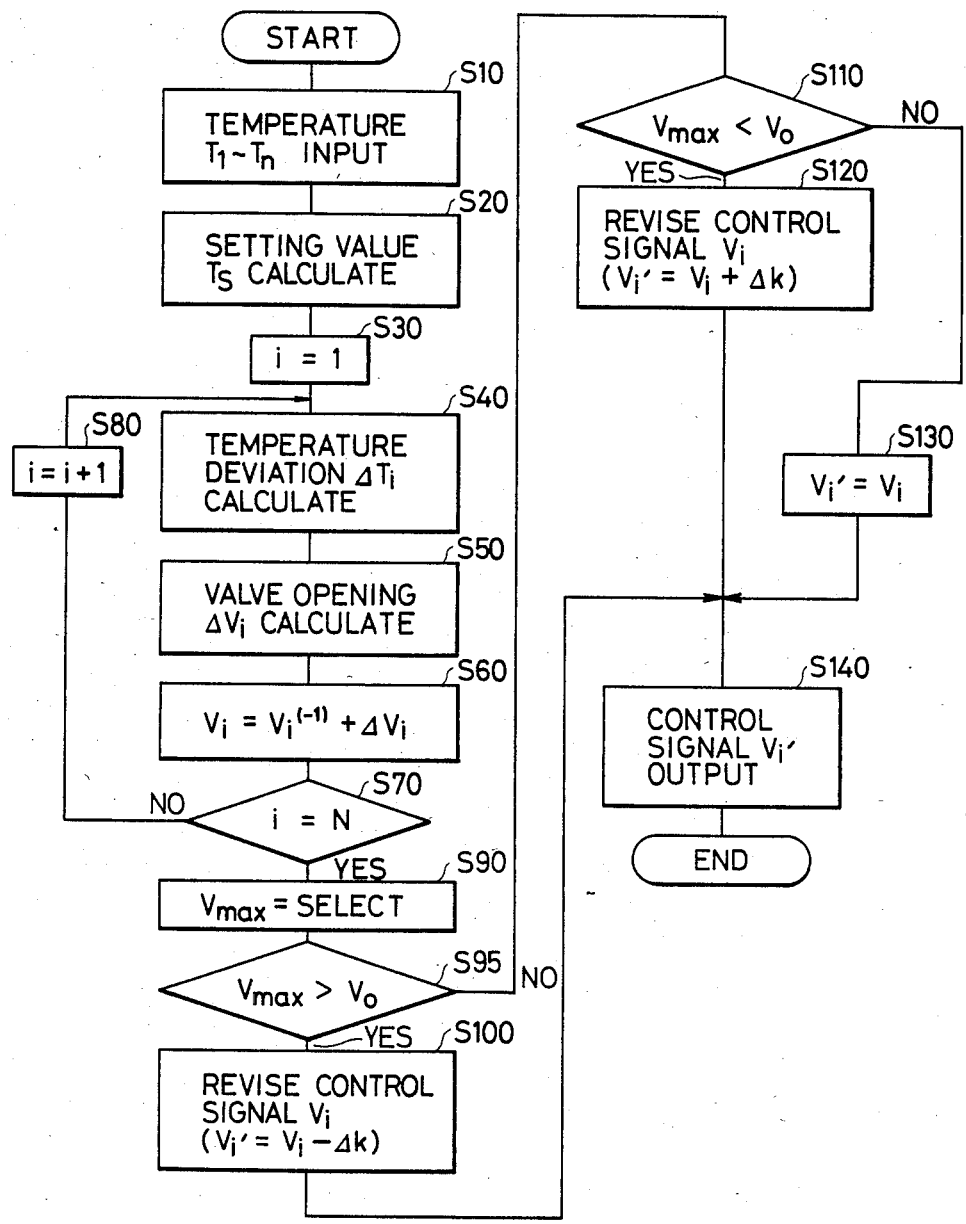
FIG. 2 is an operating flow chart showing the detailed operation of the embodiment in FIG. 1.

FIG. 1 is a block diagram showing an embodiment of the present invention, while FIG. 2 is an operating flow diagram thereof.

In FIG. 1, symbols H1, H2, H3, . . . and Hn denote heat exchangers, which have the function of affording the amount of heat of a heating medium A to a medium to-be-heated B. Here, the heating medium A signifies a heating fluid or a cooling fluid. In addition, the medium to-be-heated B signifies a fluid to-be-heated or a fluid to-be-cooled. Hereinbelow, the heating medium shall be explained as the heating fluid, and the medium to-be-heated as the fluid to-be-heated. Symbols 11, 12, 13, . . . and 1n indicate temperature sensors, which deliver electric signals corresponding to temperatures. The temperature sensors 11-1n are disposed in the same positions of the corresponding heat exchangers, the positions being except for the inlets of the fluid to-be-heated B in the heat exchangers. In the arrangement of FIG. 1, the temperature sensors 11-1n are installed at the outlets of the fluid to-be-heated B in the respective heat exchangers. Symbol 2A denotes a temperature sensor which is disposed at the entrance of the heating fluid A, and symbol 2B a temperature sensor which is disposed at the exit of the fluid to-be-heated B posterior to a confluence. Symbols CV1, CV2, CV3, . . . and CVn denote control means which are disposed on the outgoing sides of the fluid to-be-heated B in the corresponding heat exchangers H1, H2, H3, . . . and Hn so as to control the temperatures of the fluid to-be-heated B. In the arrangement of FIG. 1, control valves for controlling flow rates are employed as the control means. Shown at numeral 10 is arithmetic control means, which is a computer in FIG. 1. Each of the control valves CV1, CV2, CV3, . . . and CVn is actuated in accordance with a control signal (valve opening command) which is delivered from the computer 10.

The apparatus shown in FIG. 1 operates as follows. The heat exchangers are supplied with the heating fluid A and the fluid to-be-heated B and supply the heat of the fluid A to the fluid B, so that the fluid B is heated. The temperatures of the heat exchanger outlets of the fluid to-be-heated B are sensed by the temperature sensors 11-1n, the sensed values $T_1$-$T_n$ of which are applied to the computer 10. The computer 10 calculates the optimum control signals on the basis of the sensed value inputs, and supplies them to the corrresponding control valves CV1-CVn so as to control the flow rates of the fluid to-be-heated B. The internal operations of the computer 10 are as illustrated in FIG. 2. The output of a timer (not shown), which delivers a start signal every fixed time, starts a control program so as to perform a series of operations. First, the sensed values $T_1$-$T_n$ of the respective temperature sensors 11-1n are received as inputs (step S10). Next, a temperature setting value $T_s$ which serves as the reference of a temperature balancing control is calculated on the basis of the input values (step S20). Subsequently, each of the sensed temperature values $T_1$-$T_n$ is compared with the temperature setting value $T_s$, whereupon the valve opening variation $\Delta V_i$ of each control valve is calculated on the basis of a deviation $\Delta T_i$ ($i = 1, 2, \ldots, n$) obtained by the comparison. The control signal (valve opening) $V_i$ of each control valve is evaluated from the variation $\Delta V_i$. That is, the following is calculated:

$$\Delta T_i = T_i - T_s \tag{1}$$

$$\Delta V_i = \alpha \cdot \Delta T_i \tag{2}$$

$$V_i = V_i^{(-1)} + \Delta V_i \tag{3}$$

where

α: the coefficient of conversion, $V_i^{(-1)}$: the control signal of the i-th control valve in the last control.

These are operations indicated in steps S30-S80. After all the control signals $V_i$ for the control valves have been calculated, the operating flow proceeds to the next step. At step S90, the maximum value $V_{max}$ is selected from among all the control signals $V_i$. Next, the maximum value $V_{max}$ is compared with a preset control reference value $V_o$ at step S95. Subject to $V_{max} > V_o$, the processing flow proceeds to step S100. The reference value $V_o$ is selected at a magnitude corresponding to a valve opening of 50%-100%, in consideration of the overall efficiency. However, $V_o$ is not restricted thereto, but any desired magnitude other than 0% can be selected therefor. Moreover, if necessary, $V_o$ can be altered during the operation of the apparatus. Step S100 executes the calculation of revising the control signal $V_i$. This calculation is as follows:

$$\Delta k = |V_{max} - V_o| \tag{4}$$

$$V_i' = V_i - \Delta k \tag{5}$$

where $i = 1, 2, \ldots, n$ $V_i'$; revised control signal.

As the result of the calculation, $V_{max}$ is revised to $V_o$, and also the other control signals $V_i$ are equally revised by $\Delta k$.

When $V_{max} = V_o$ or $V_{max} < V_o$ holds, the control flow proceeds to step S110. When $V_{max} < V_o$ holds at step S110, the processing flow proceeds to step S120, which revises the control signal $V_i$ as follows:

$$V_i' = V_i + \Delta k \tag{6}$$

As the result of the calculation, $V_{max}$ is revised to $V_o$, and also the other control signals $V_i$ are equally revised by $\Delta k$. In case of $V_{max} = V_o$, the processing flow proceeds to step S130, and the control signal is not revised in this case. That is, $V_i' = V_i$ is held. At step S140, the revised control signals $V_i'$ are fed to the respective control valves. On the basis of the control signals $V_i'$, the control valves regulate the valve openings so as to control the flow rates of the fluid to-be-heated B.

Figure 3:
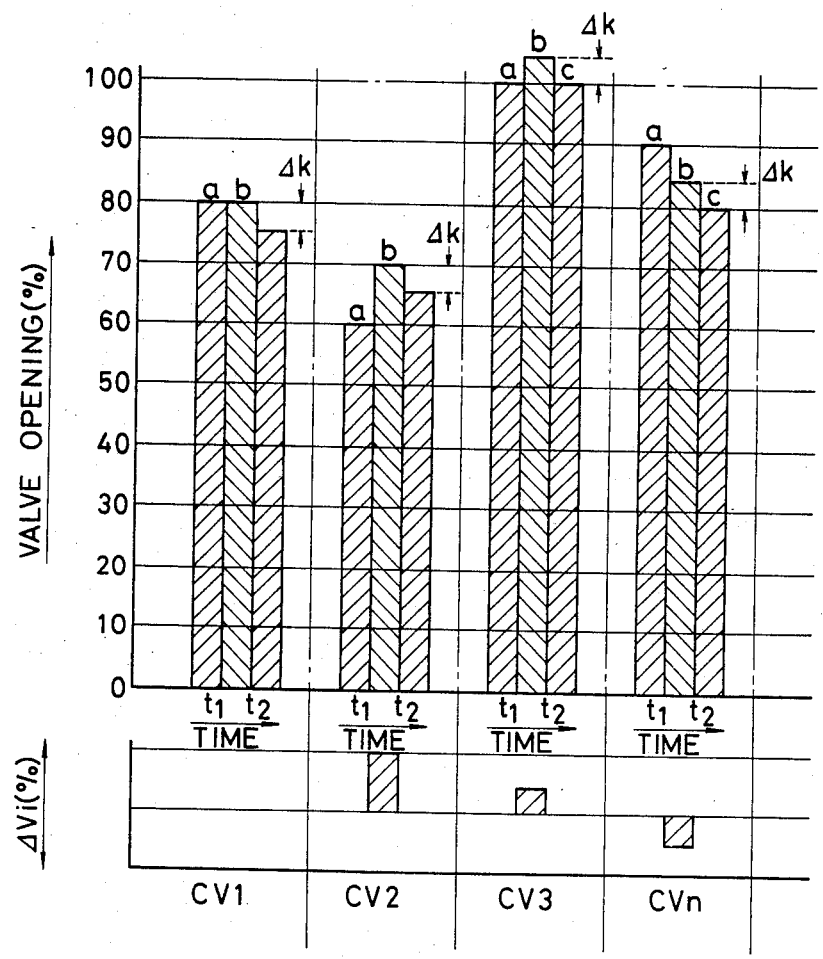
FIG. 3 is a diagram for explaining the operation of the embodiment in FIG. 1.

The operations of FIG. 2 are intelligibly illustrated in FIG. 3. Let's consider the state in which, at a point of time $t_1$, the valve opening of the control valve CV1 is 80%, that of the control valve CV2 is 60%, that of the control valve CV3 is 100%, and that of the control valve CVn is 90%. It is assumed that the calculations up to step S80 in FIG. 2 have given the control signals $V_i$ with which the valve openings of the control valves fall into a state b (CV1: 80%, CV2: 70%, CV3: 105%, CVn: 85%). On this occasion, the control valve CV3 comes to have the valve opening of 105% and becomes uncontrollable in actuality. Accordingly, the actual control signals $V_i'$ at a point of time $t_2$ are revised so as to bring the valve openings of the control valves into an illustrated state c (CV1: 75%, CV2: 65%, CV3: 100%, CVn: 80%). The control reference value $V_o$ in the case of FIG. 3 corresponds to the valve opening of 100%.

Although, in the above example, the revision of the control signals $V_i$ has been made on the basis of the difference $\Delta k$ between the maximum value $V_{max}$ and the reference value $V_o$, this is not restrictive. For example, it is also allowed to take the ratio of the values $V_{max}$ and $V_o$ and to revise all the control signals on the basis of the ratio. The revision of the control signal in the case of employing the ratio can be realized with the following equations by way of example:

$$M = V_o / V_{max} \qquad (7)$$

$$V_i' = V_i \cdot M \qquad (8)$$

where M; proportion coefficient.

Although the temperature control means in FIG. 1 has been the valves for controlling the flow rates of the medium to-be-heated B, the present invention is not restricted thereto. For example, it is also allowed to employ an appliance which changes the temperature or flow rate of the heating medium A. A heater may well be employed. Anyway, means capable of controlling the temperature of the medium to-be-heated B suffices.

In the foregoing embodiment, the temperature setting value $T_s$ may concretely be any of the sensed temperature values $T_1$–$T_n$ mentioned before or the mean value of the values $T_1$–$T_n$. It may well be the sensed value of the temperature sensor 2B which is located at the exit of the fluid to-be-heated B in FIG. 1.

The sensed value of the temperature sensor 2A in FIG. 1 is utilized for a predictive control which predicts the temperature fluctuations of the fluid to-be-heated B attributed to a temperature fluctuation on the incoming side of the heating fluid A and which serves to mitigate the temperature fluctuations of the fluid B. The sensed value of the temperature sensor 2B is utilized, not only as the temperature setting value stated above, but also for a feedback control which maintains the temperature of the fluid to-be-heated B at a desired value.

As described above, according to the present invention, the drawbacks of uncontrollability etc. can be eliminated, and the temperature balancing control of high reliability can be realized.

What is claimed is:

1. An apparatus for the temperature control of a plurality of heat exchangers comprising:
a plurality of heat exchangers connected for use in parallel for effecting heat exchange, between a heating medium and a medium to-be-heated; temperature sensors for sensing the temperatures of the heating medium or the medium to-be-heated provided in said heat exchangers respectively; regulation means for controlling temperatures of the medium to-be-heated in the heat exchangers respectively; and arithmetic control means having first means for calculating a first difference between the respective sensed temperature values and a temperature setting value of the medium to-be-heated, and for calculating control signals for said regulation means using said first difference for balancing temperatures of the medium to-be-heated which flows out of the respective heat exchangers, second means for selecting the maximum value of said control signals calculated by said first means, third means for calculating a second difference between said maximum value and a preset reference value, and for revising all the control signals on the basis of the second difference, and fourth means for supplying the revised signals to said regulation means respectively.

2. An apparatus for the temperature control of a plurality of heat exchangers as set forth in claim 1, wherein said third means for calculating the second difference between said maximum value and said preset control reference value, when the maximum value is higher than the preset control reference value, decreases all the control signals by the second difference, and when the maximum value is lower than said preset control reference value, increases all the control signals by the second difference.

3. An apparatus for the temperature control of a plurality of heat exchangers as set forth in claim 1, wherein said regulation means are control valves.

4. An apparatus for the temperature control of a plurality of heat exchangers as set forth in claim 1, wherein said arithmetic control means is a computer.

5. An apparatus for the temperature control of a plurality of heat exchangers as set forth in claim 1, wherein said heating medium is a heating fluid, and said medium to-be-heated is a fluid to-be-heated.

6. An apparatus for the temperature control of a plurality of heat exchanger as set forth in claim 3, wherein said preset reference value is selected at a magnitude corresponding to a valve opening of 50%–100%.

* * * * *